(12) United States Patent
Cartigny et al.

(10) Patent No.: US 7,565,862 B2
(45) Date of Patent: Jul. 28, 2009

(54) FOOD PRESSURE-COOKING DEVICE WITH A ROTARY LOCKING/UNLOCKING CONTROL DEVICE

(75) Inventors: Michel Pierre Cartigny, Mirebeau sur Beze (FR); Eric Chameroy, Veronnes (FR)

(73) Assignee: SEB S.A., Ecully Cedex (FR)

(*) Notice: Subject to any disclaimer, the term of this patent is extended or adjusted under 35 U.S.C. 154(b) by 642 days.

(21) Appl. No.: 10/507,222

(22) PCT Filed: Mar. 10, 2003

(86) PCT No.: PCT/FR03/00755

§ 371 (c)(1), (2), (4) Date: Mar. 25, 2005

(87) PCT Pub. No.: WO03/075724

PCT Pub. Date: Sep. 18, 2003

(65) Prior Publication Data

US 2005/0166908 A1    Aug. 4, 2005

(30) Foreign Application Priority Data

Mar. 8, 2002 (FR) .................................. 02 03091

(51) Int. Cl.
*A23L 1/00* (2006.01)
(52) U.S. Cl. .................... 99/337; 99/403; 220/314; 220/316; 220/912
(58) Field of Classification Search .................. 99/337, 99/338, 403, 492; 220/314, 316, 912, 573.1
See application file for complete search history.

(56) References Cited

U.S. PATENT DOCUMENTS

| 4,307,818 | A | * | 12/1981 | Singh et al. ................. 220/316 |
| 4,467,936 | A | * | 8/1984 | Makhijani ................... 220/246 |
| 5,613,424 | A | * | 3/1997 | Chameroy et al. ............. 99/337 |
| 5,643,485 | A | * | 7/1997 | Potter et al. ................. 219/621 |
| 6,019,029 | A | * | 2/2000 | Chan ......................... 99/337 |
| 6,257,124 | B1 |   | 7/2001 | Chen ......................... 99/337 |

FOREIGN PATENT DOCUMENTS

| EP | 1029483 A1 | * | 8/2000 |
| WO | WO 96/01069 A |   | 1/1996 |
| WO | 1044642 A |   | 10/2000 |

* cited by examiner

*Primary Examiner*—Tu B Hoang
*Assistant Examiner*—Stephen J Ralis
(74) *Attorney, Agent, or Firm*—Thoman, Kayden, Horstemeyer and Risley, LLP

(57) ABSTRACT

Appliances for cooking food under pressure are disclosed herein. According to one embodiment, a cooking appliance comprises a vessel (1), a lid (2), at least one jaw (4) mounted to be moved by a driving device (5), and an opening/closing control device (6, 7, 8). The opening/closing control device (6, 7, 8) includes an intermediate part (7), which comprises a maneuvering device (7A, 7B) and a clutch device (7C, 19). The intermediate part (7) is mounted to turn freely so that the maneuvering device (7A, 7B) co-operates with the driving device (5). The opening/closing control device also includes a main control member (6) comprising a transmission device (6C), the main control member (6) being positioned so that the transmission device (6C) co-operates with the clutch device (7C). The main control member (6) is mounted to move in translation. Other embodiments disclosed herein are also applicable to domestic appliances for cooking food under pressure.

29 Claims, 3 Drawing Sheets

FOOD PRESSURE-COOKING DEVICE WITH A ROTARY LOCKING/UNLOCKING CONTROL DEVICE

CROSS-REFERENCE TO RELATED APPLICATIONS

This application is a national stage application of International Application No. PCT/FR03/00755, filed Mar. 10, 2003, which claims priority to FR 02/03091, filed Mar. 8, 2002, both applications of which are hereby incorporated by reference in their entirety into the present application.

TECHNICAL FIELD

The present invention relates to the general technical field of domestic appliances for cooking under pressure that comprise a vessel and a lid designed to be locked on the vessel to form a sealed cooking enclosure, said appliances being intended to cook food contained in the vessel under steam pressure.

The present invention relates to an appliance of the pressure cooker type for cooking food under pressure, and comprising at least:
 a vessel and a lid for being fitted to and locked on said vessel in order to form a leaktight cooking enclosure;
 one or more jaws mounted to move in translation by drive means between a position in which the lid is locked relative to the vessel, and an unlocking position; and
 a control device for controlling the movement of the at least one jaw.

The present invention also relates to a device for controlling the movement of the at least one jaw enabling the force exerted by the user to be reduced.

PRIOR ART

A receptacle for cooking under pressure is already known that comprises a vessel and a lid, said lid having jaws mounted to move radially and associated with a device for controlling movement of the jaws between a position for locking the lid relative to the vessel, and an unlocking position. The control device comprises a rotary knob whose axis of rotation coincides with the general axis of symmetry of the pressure cooker, the knob co-operating directly with a system of links for transforming the rotary movement of the knob into centrifugal or centripetal movement of the jaws. It turns out that the device implemented in the prior art for controlling movement of the jaws provides insufficient safety in use and is not sufficiently ergonomic. Using a rotary knob is ergonomically awkward since it can lead to risks in terms of safety. Thus, it can firstly be observed that the actions that are to be performed, corresponding firstly to opening the jaws and secondly to closing the jaws, are actions that are very similar since in both cases they consist in turning the same knob. The difference between the direction of rotation is generally not sufficient to enable the user to remember in instinctive and natural manner which turning direction corresponds to which technical result (closing or opening). In the present case, the distinction is made more difficult to establish in that the jaws are hidden by a casing, such that the user cannot see the result of taking action on the rotary knob.

Furthermore, the user is obliged to use both hands to operate the rotary control knob: one hand is needed to turn the knob itself, while the other hand is needed to prevent the remainder of the appliance from moving so that it does not turn when action is taken on the knob.

The control operations to be performed are thus relatively constraining, and run the risk of the user putting a hand on a hot portion of the appliance.

It should also be observed that the proposed control mechanism and the relative displacements of the parts made up the control device require the user to impart a relatively large amount of control force, and that too goes against safety in use, since exerting such a large force on the rotary knob increases the risk of the entire pressure cooker escaping from the user's hands, which can be particularly dangerous when the receptacle is hot.

Finally, the prior art appliance is of relatively complex design, making use of numerous moving parts, leading to significant risks of wear and of seizing, and also to high manufacturing costs, for operating reliability that is not optimized.

SUMMARY OF THE INVENTION

Consequently, the invention seeks to remedy the various drawbacks listed above and to propose a novel appliance for cooking food under pressure in which the device for controlling the movement of the jaws can be controlled by actions that differ considerably for the operations of closing and of opening, and also enabling the amount of force that a user needs to deliver to be reduced when locking/unlocking the appliance, and also providing a cooking appliance that is more compact.

Another object of the invention is to propose a novel cooking appliance that is ergonomically generally improved, in particular concerning its device for controlling jaw movement.

Another object of the invention is to propose a cooking appliance that is of simplified design and that is easier to assemble.

The objects given to the invention are achieved by means of an appliance for cooking food under pressure and comprising at least:
 a vessel and a lid for being fitted to and locked on said vessel in order to form a leaktight cooking enclosure;
 one or more jaws mounted to move in translation by means corresponding drive means between a position in which the lid is locked relative to the vessel, and an unlocking position; and
 a control device for controlling the movement of the at least one jaw, the control device comprising:
  an intermediate part comprising at least one maneuvering means and at least one clutch means, and mounted to turn freely relative to the drive means so that the maneuvering means co-operates with said drive means so as to control the displacement thereof; and
  a main control member comprising at least one transmission means, said main control member being positioned relative to the intermediate part so that the transmission means co-operates with the clutch means so as to control turning of the intermediate part when the main control member is actuated,
 the appliance being characterized in that the main control member is mounted to move in translation relative to the lid.

BRIEF DESCRIPTION OF THE DRAWINGS

Other features and advantages of the invention will appear and be seen in greater detail on reading the following description made with reference to the accompanying drawings that are given by way of non-limiting and illustrative example, and in which.

BEST METHOD OF PERFORMING THE INVENTION

Figure 1:
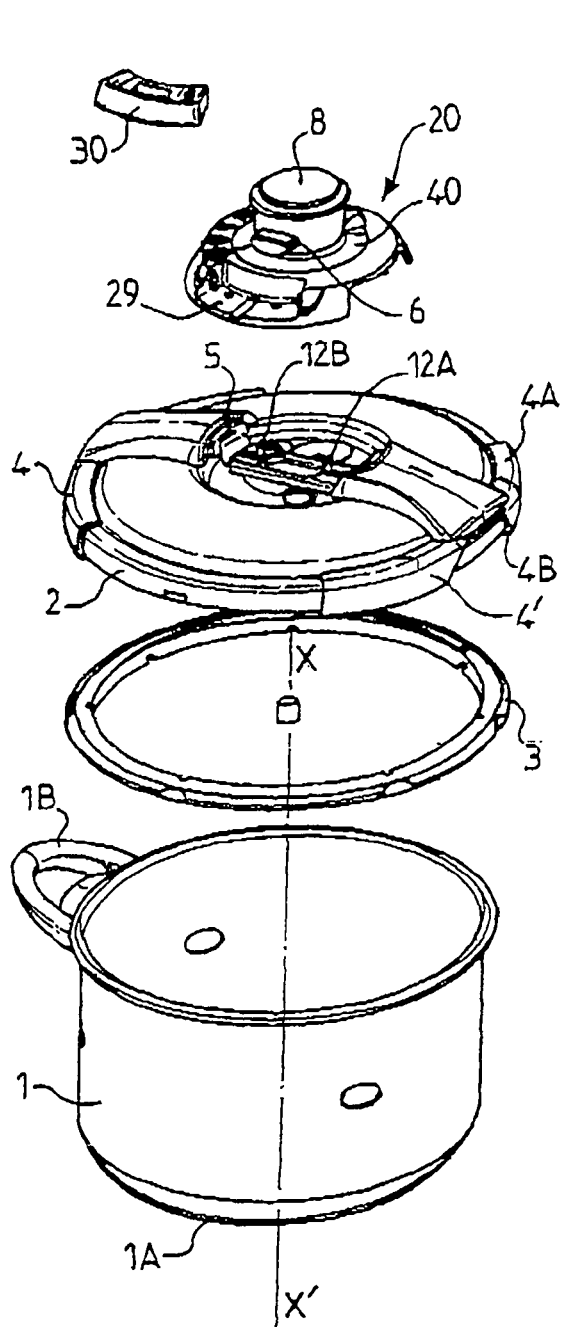
FIG. 1 is an exploded general perspective view showing the various elements constituting a pressure cooker in accordance with the invention.
Figure 2:
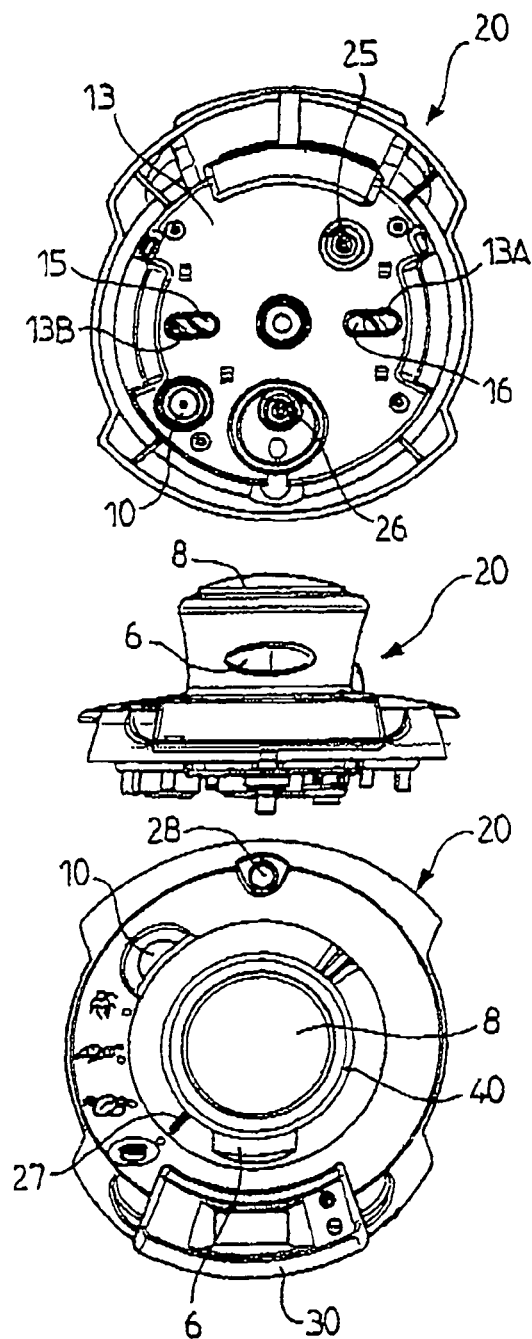
FIG. 2 shows a module for being fitted on and releasably secured to the lid of a pressure cooker in accordance with the invention, shown respectively (from top to bottom) in a view from beneath, in a side view, and in a view from above.

The cooking appliance in accordance with the invention is for cooking various foods under pressure in a domestic context.

The cooking appliance comprises a vessel 1 of substantially cylindrical shape having an axis of (circular) symmetry X-X', and is designed to have a lid 2 fitted thereon in leaktight manner.

Below, the adjective "axial" is used to refer to the direction of said axis of symmetry, which is close to the vertical when the pressure cooker is in normal operation.

Conventionally, the vessel 1 is made of a metal material such as stainless steel and it is provided with a heat-conductive bottom 1A that is secured to the vessel 1, e.g. by hot stamping.

The vessel 1 also includes handle members such as handles 1B fixed to the walls of the vessel 1.

The lid 2 is generally disk-shaped, and it is locked on the vessel 1 by means of at least one jaw 4 that is mounted to move between a locking position in which the lid is secured to the vessel, and an unlocking position in which the lid can be withdrawn from the vessel.

The jaw 4 is conventionally in the form of channel-section segments adapted to the shape of the receptacle, and in the example shown in the figures, in the form of optionally-notched circular arcs of determined length.

The jaw 4 has a bottom rim 4B and a top rim 4A serving to clamp respectively against the peripheral rim of the vessel 1 and against the peripheral rim of the lid 2.

The appliance in accordance with the invention for cooking under pressure comprise at least:
 a vessel 1 and a lid 2 for fitting to the vessel 1 in order to form a leaktight cooking enclosure;
 one or more jaws 4 mounted to be moved in translation by corresponding drive means 5 between a position for locking the lid 2 relative to the vessel 1 and an unlocking position; and
 a device for controlling the movement of the at least one jaw 4.

The cooking enclosure is sealed by locking the lid 2 on the vessel 1, the lid 2 being provided with sealing means constituted by an annular lip sealing gasket 3, for example.

In the invention, the device for controlling the movement of the at least one jaw 4 comprises an intermediate part 7 which comprises at least one maneuvering means 7A, 7B and one clutch means 7C, 19 which are described in greater detail below. The intermediate part 7 is mounted to turn freely relative to the drive means 5 so that the maneuvering means 7A, 7B co-operate with said drive means 5 in such a manner as to control the displacement thereof.

The intermediate part 7 turns in a plane that is substantially horizontal about an axis that is substantially parallel with, or that coincides with, the axis of symmetry X-X' of the cooking appliance.

According to the invention, the device for controlling the movement of the at least one jaw 4 also comprises a main control member 6. The main control member 6 comprises at least one transmission means 6C, 18, 30, 31 which is described in greater detail below. The main control member 6 is positioned relative to the intermediate part 7 so that the transmission means 6C, 18, 30, 31 co-operate with the clutch means 7C, 19 so as to control rotation of the intermediate part 7 when the main control member 6 is actuated by the user.

Thus, in accordance with the invention, the main control member does not co-operate directly with the intermediate part, but indirectly, via a clutch type system implemented by the transmission means and the clutch means.

According to an essential characteristic of the invention, the main control member is mounted to move in translation relative to the lid 2.

Such movement in translation corresponds to a slideway type mechanical connection.

The general principle of the invention thus relies:
 on transforming movement in translation, which turns out to be particularly ergonomic for a user to generate, into an intermediate movement in rotation, which is particularly suited to the various control and force-reducing operations; and
 on transforming said movement in rotation into movement in translation, which then needs to be communicated to the at least one jaw 4.

Advantageously, the at least one jaw 4 is mounted to move in a substantially radial direction relative to the general axis of symmetry X-X' of the cooking appliance.

Advantageously, the main control member 6 is also mounted to move in a substantially radial direction.

Advantageously, the main control member 6 controls turning of the intermediate part 7 in active manner in the locking direction and in the unlocking direction. The main control member 6 is thus reversible and can be actuated by pushing and by pulling, for example. As shown in the figures, the locking direction corresponds to turning the intermediate part 7 in the counterclockwise direction and in a corresponding centripetal displacement of the drive means 5 and thus of the at least one jaw 4, whereas the unlocking direction corresponds to turning the intermediate part in the clockwise direction and in a corresponding centrifugal displacement of the drive means 5 and thus of the at least one jaw 4.

Figure 4:
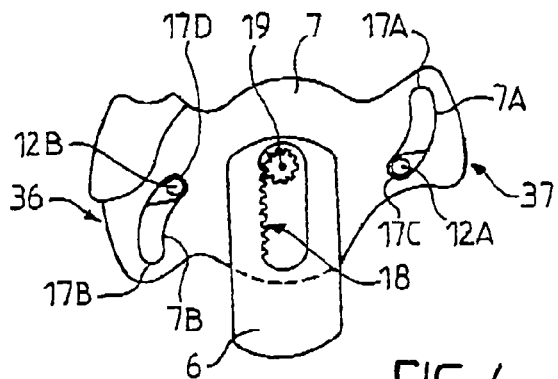
FIG. 4 shows a variant embodiment of clutch means for a device for controlling the movement of the jaws in a pressure cooker in accordance with the invention.

In a first variant embodiment of a pressure cooker in accordance with the invention, the clutch means is constituted by a pinion 19 mounted axially stationary on the intermediate part 7. The axis of rotation of the pinion 19 coincides with the axis of rotation of the intermediate part 7, which axis preferably coincides with the axis of symmetry X-X' of the pressure cooker. Advantageously, the transmission means, as shown in FIG. 4, is constituted by a rack 18 formed in the main control member 6 to mesh lateral with the pinion 19. The rack 18 is stationary relative to the main control member 6 so that when the main control member moves in translation, the rack 18 also moves in translation, thereby turning the pinion 19 and thus the intermediate part 7.

In a variant embodiment of the invention, the transmission means is constituted by a worm screw 31 mounted stationary on the main control member 6 and extending in its direction of translation, together with a gearwheel 30, which is mounted stationary relative to the lid 2 and which meshes perpendicularly with the pinion 19. The gearwheel 30 has a central tapped hole co-operating with the worm screw 31 so that its movement in translation acts via the tapped hole to turn the gearwheel 30, which in turn turns the pinion 19, and thus the intermediate part 7.

It is also possible to envisage that the transmission and clutch means could be formed by a link (not shown) connecting the intermediate part 7 to the main control member 6.

In a preferred variant embodiment of the invention, the clutch means are constituted by a guide peg 7C secured to the intermediate part 7 and extending axially therefrom.

Preferably, the guide peg 7C is substantially cylindrical in shape, and its top end is chamfered.

Advantageously, the transmission means comprises at least one plane surface 32 extending obliquely relative to the radial direction, and arranged in such a manner that movement in translation of the main control member 6 causes the guide peg 7C to engage via the plane surface 32, which pushes the guide peg 7C, thereby causing the intermediate part 7 to turn. This plane thus acts as a ramp and engages the guide peg 7C whose function can be considered as being equivalent to that of a bayonet coupling stud. Under the effect of the force which is transmitted to the guide peg 7C by the plane surface 32, the peg slides against said surface, thereby imparting a turning movement to the intermediate part 7.

In a particularly advantageous version of the invention, the transmission means is constituted by an oblong drive orifice 6C extending obliquely relative to the radial direction, and co-operating with the guide peg 7C in such a manner that movement in translation of the control member 6 causes the intermediate part 7 to turn. The oblong drive orifice 6C is made through the thickness of the intermediate part 7, and its width matches the section of the guide peg 7C. Implementing such an oblong drive orifice enables the control member 6 to be made to be reversible.

Advantageously, the intermediate part 7 is mounted to turn resiliently relative to the lid 2 so that its resilient return position corresponds to the at least one jaw 4 being locked.

Figure 9:
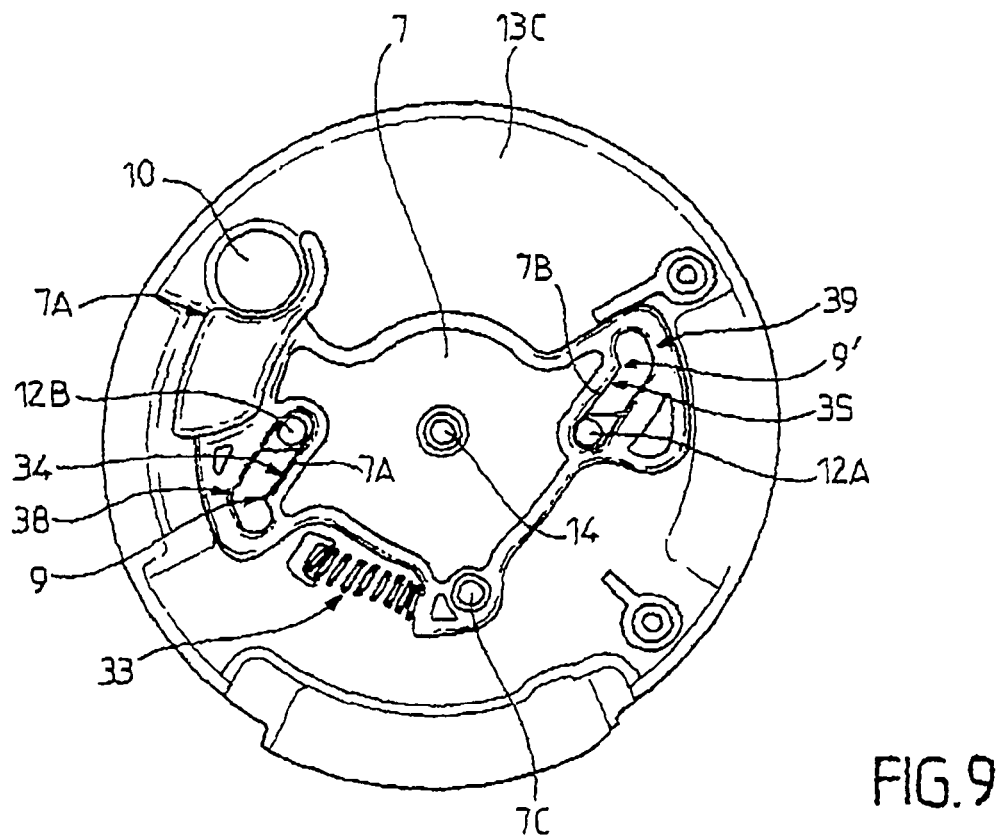
FIG. 9 is a plan view showing an embodiment detail of a preferred variant of the device for controlling locking/unlocking of the lid of a pressure cooker in accordance with the invention.

Preferably, the intermediate part 7 is mounted to turn resiliently against a compression spring 33, as shown in FIG. 9. One of the ends of the compression spring 33 is thus directly or indirectly secured to the lid 2, while its other end engages the intermediate part 7, thereby exerting a substantially tangential force on the periphery of said intermediate part 7, so as to hold it in the position corresponding to the at least one jaw 4 being locked.

In another variant embodiment, the intermediate part 7 is mounted to turn resiliently against a torsion spring (not shown). The resilient mounting of the intermediate part 7 may naturally be achieved by any other resilient means known to the person skilled in the art, without thereby going beyond the ambit of the invention.

Advantageously, the drive means 5 comprises at least one drive arm 5A, 5B paired with the at least one jaw 4, 4' which is guided to move in translation relative to the lid 2, and which presents an outer end 24, 25 connected to the corresponding at least one jaw 4, 4', and an inner end 22, 23 for co-operating with the maneuvering means 7A, 7B.

In a preferred variant embodiment of the invention, there are two jaws 4, 4' which are mounted, preferably in opposition, on the lid 2 by two respective drive arms 5A, 5B. In preferred manner, each drive arm 5A, 5B is in the form of a metal bar, e.g. a bar that is rectilinear, substantially flat, and of profile that matches that of the lid 2. The drive arms 5A, 5B may be of sufficient length to enable them to be superposed at least in part during their movement in translation. Under such circumstances, the drive arms 5A, 5B are automatically guided in translation one in the other, a first arm 5A constituting a male arm and the other arm 5B constituting a female arm, the male arm 5A sliding in the female arm 5B.

Preferably, the linear movement in translation of the drive arms 5A, 5B is guided by additional guide means secured to the lid 2.

In a preferred variant, the additional guide means comprise a support part 11 which encompasses the drive arms 5A, 5B over a fraction of their length. Still more preferably, the support part 11 is constituted by a channel-section plate encompassing and covering the drive arms 5A, 5B, with the inside face of the web of the channel-section facing towards the lid 2.

In which case, there is no need for the drive arms 5A, 5B to be superposed or to come into mutual contact.

Preferably, the additional guide means also comprise guide pins (not visible in the figures) associated with the drive arms 5A, 5B and extending axially substantially at the periphery of the lid 2 and securely fastened thereto.

These guide pins co-operate with corresponding guide-path forming means which are secured to the drive arms 5A, 5B and/or to the jaws 4, 4' so as to form a radial slideway connection between the lid 2 and the drive arms 5A, 5B, and the jaws 4, 4'.

Advantageously, the guide pins are constituted by cylindrical studs, each having one end crimped to the lid 2, and having an opposite end that is threaded.

The guide-path forming means are advantageously constituted by respective oblong holes formed longitudinally in the thickness of the outer ends 24, 25 of the drive arms 5A, 5B and in the thickness of the jaws 4, 4'.

The guide pins are thus positioned in the respective oblong holes, with nuts being tightened onto the threaded ends of said guide pins so as to prevent them from becoming disengaged from the oblong holes forming the guide paths. The length of the oblong holes is naturally adapted to the stroke which the drive arms 5A, 5B are to perform between the open and closed positions of the jaws 4, 4'.

Advantageously, the inner end 22, 23 of each drive arm 5A, 5B is provided with a respective axial guide stud 12A, 12B.

Preferably, the guide studs 12A, 12B are constituted by vertical cylindrical studs having chamfered top ends. They extend substantially vertically outwards from the cooking receptacle and they are situated at the ends of the drive arms 5A, 5B that are closer to the center of the lid 2, i.e. respectively to the inner ends 22, 23 situated remotely from the jaws 4, 4'.

In a first variant embodiment of the invention, the maneuvering means comprise at least one ramp-forming surface 34, 35 extending obliquely relative to the radial direction, and arranged in such a manner that when the intermediate part 7 turns, the ramp-forming surface 34, 35 engages the corresponding axial guide stud 12A, 12B and pushes it so as to cause the drive means 5A, 5B to move.

The at least one ramp-forming surface 34, 35 may be plane or curved in shape.

It co-operates with the axial guide stud 12A, 12B with which it is associated, in the same manner as a ramp co-operates with a stud in a bayonet coupling. The radial direction relative to which the at least one ramp-forming surface extends obliquely corresponds to the direction of the line passing through the axis of rotation of the intermediate part 7 and through the axial guide stud. Since the drive arms 5A, 5B are guided in translation, the axial guide stud 12A, 12B is likewise guided in translation, such that under the thrust exerted by the ramp-forming surface 34, 35, the axial guide stud 12A, 12B slides along said surface along a path that corresponds to said direction of movement in translation.

In a preferred embodiment of the invention, the maneuvering means comprises at least one oblong maneuvering slot 7A, 7B arranged in the thickness of the intermediate part 7 to engage the corresponding axial guide stud 12A, 12B so that turning of the intermediate 7 leads to movement of the drive means 5A, 5B.

In the preferred case, where there are two jaws 4, 4' mounted on two respective drive arms 5A, 5B, the intermediate part 7 is provided with two oblong maneuvering slots 7A, 7B disposed symmetrically about the axis of rotation of the intermediate part 7 and extending respectively between pairs of ends 17A, 17C and 17B, 17D as can be seen in FIGS. 3 to 6, and in particular FIG. 4. In a first variant embodiment, said oblong maneuvering slots 7A, 7B may be curved in shape, being substantially arcuate having a center of curvature that is offset from the pivot point of the intermediate 7 so that one of the ends 17C, 17D of each maneuvering slot 7A, 7B is offset towards the center (inwards) of the intermediate part 7 compared with the other end 17A, 17B. In the example shown in FIG. 3, the center or pivot point of the intermediate part 7 is situated on the axis X-X' of the receptacle.

Preferably, and as shown in the figures, the intermediate part 7 is a control-wheel-forming plate having as many lugs 36, 37 as there are jaws, with the oblong maneuvering slots 7A, 7B being formed in the lugs.

In a preferred embodiment of the invention shown in FIG. 9, each of the oblong maneuvering slots 7A, 7B has a substantially rectilinear portion extending obliquely relative to the radial direction, which rectilinear portion forms, at one of its ends, a bend 38, 39 that is reentrant towards the inside of the plate 7, i.e. towards its axis of rotation.

The oblong maneuvering slots 7A, 7B are thus substantially L-shaped, but the limbs of the L-shape form an obtuse angle (greater than 90°) relative to each other, and preferably an angle that is wide open.

In an alternative embodiment of the invention, the maneuvering means comprises a link, having one of its ends connected via a pivot connection to the drive means 5A, 5B, and having its other end connected via another pivot connection to the intermediate part 7. Such a link system is known to the person skilled in the art, in particular from patent application WO 96/01069 in the name of the same Applicant, to which reference may be made for a more complete description.

Advantageously, the drive means 5A, 5B are mounted to slide resiliently relative to the lid 2, so that the resilient return position corresponds to the at least one jaw 4 being locked.

In the preferred case in which the drive means 5 are formed by two drive arms 5A, 5B that are guided in translation and mounted in opposition, it is advantageous to interconnect the respective inner ends of said arms 5A, 5B by resilient return means (not visible in the figures), e.g. by a spring which is arranged to urge the drive arms 5A, 5B towards each other, each in a centripetal radial direction. Under the effect of this return force, the jaws 4, 4' are thus held stably in the locking position.

In a preferred variant of the invention, the main control member 6 is dynamically coupled to a secondary control member 8 that is mounted to move on the lid 2 in a substantially axial direction, said secondary control member 8 being suitable for controlling displacement of the drive means 5 in the locking direction. To achieve such dynamic coupling, the main control member 6 and the secondary control member 8 may each be provided with a respective engagement surface 6A, 8A, said surfaces being shaped to co-operate with each other, e.g. via a contact interface formed by a sloping plane, e.g. at 45° relative to the axis of symmetry X-X'. Such a "wedging" dynamic coupling acts in conventional manner to transform axial movement of the secondary control member 8 into centrifugal radial movement of the main control member 6. In a preferred operating variant, the main control member 6 can be thought of as an opening member, with actuation thereof in a centripetal radial direction causing the intermediate part 7 to turn so as to engage the drive means 5 and cause displacement thereof towards the position for opening the at least one jaw 4. The secondary control member 8 can be thought of as a closure member, with axial displacement thereof pushing away the main control member 6 in a centrifugal radial direction, thereby causing the intermediate part 7 to turn correspondingly so as to engage the drive means 5 and cause it to move towards the position in which the at least one jaw 4 is closed, moving away from the position corresponding to unlocking into the position corresponding to locking.

Advantageously, the device for controlling movement of the jaws 4 includes reversible blocking means 9, 9', 9" for locking the drive means 5 in the unlocking position. The reversible blocking means 9 thus enable a stable unlocking position to be obtained. The reversible blocking means 9, 9', 9" may rely, for example, on the principle of a catch or an abutment-cam, the cam being secured to the intermediate part 7 while the abutment is stationary relative to said intermediate part 7.

Preferably, the secondary control member 8 includes release means 8A for causing the reversible blocking means 9, 9', 9" to be released. The function of the release means can be implemented directly by the dynamic coupling between the main control member 6 and the secondary control member 8. Thus, on being actuated, the secondary control member 8 engages via its sloping engagement surface 8a with the complementary engagement surface 6a formed on the main control member 6, and the force exerted in this way thereon suffices to turn the intermediate part 7 sufficiently to release the cam from the abutment.

In particularly advantageous manner, as shown in FIG. 9, the oblong maneuvering slots forming the maneuvering means are shaped so that each of them presents a bend 38, 39, which bend 38, 39 forms the reversible blocking means 9, 9'. Each bend 38, 39 provides a respective sharp point 9, 9' forming an abutment that is suitable for constituting reversible locking means of the catch-type, for locking the drive means 5 in the unlocking position. Under the action of the return force of the spring interconnecting the drive arms 5A, 5B, the guide studs 12A, 12B are subjected to a centripetal force, which in conjunction with the respective sharp-pointforming setback 9 enables the intermediate part 7 to be blocked reversibly in a stable unlocking position.

This unlocking position is released by exerting thrust on the axial pusher 8. The inclined surface 8A secured to the axial pusher 8 pushes the complementary surface 6A associated with the radial pusher 6, and the force exerted is sufficient to move the radial pusher 6 by the "wedging" effect far enough away to cause the guide stud 12A, 12B to move past the respective sharp point 9, 9', after which they complete their stroke automatically under the combined action of the compression spring 33 returning the intermediate part 7, and the return spring acting on the drive arms 5A, 5B, so that the studs reach the opposite ends of the oblong maneuvering slots 7A, 7B and reach a stable locking position, as shown in FIG. 9. Preferably, the axial pusher 8 is subjected to drive from resilient means, e.g. an axial compression spring (not shown) which keeps it at rest in a high position, i.e. in a position where the engagement surface 8A does not co-operate with the complementary surface 6A.

The device for controlling locking/unlocking is thus preferably a system that returns automatically to the closed position when the user acts on the trigger-forming axial pusher.

Figure 5:
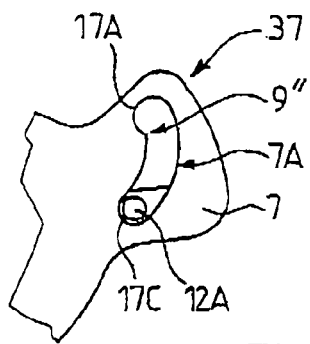
FIG. 5 shows a detail of a variant embodiment of a device for controlling the movement of the jaws of a pressure cooker in accordance with the invention.

In a variant, and as shown in FIG. 5, it is also possible for the oblong maneuvering slots 7A, 7B to have their ends 17A, 17C that correspond to the open position that are flared. This enlargement likewise produces a catch 9" suitable for forming an abutment that can constitute reversible blocking means.

Advantageously, the cooking appliance of the invention includes opening/closing safety means 10 of the finger or check valve kind. The position of the safety means 10 is sensitive to the pressure or to the temperature that exists in the cooking enclosure. The safety means 10 is mounted to move between two stable abutment positions: a low position in which said safety means 10 put the inside of the enclosure into communication with the outside below a predetermined internal pressure $P_0$, and a high position in which they close off communication between the enclosure and the outside once the pressure $P_0$ has been reached, in order to allow the pressure inside the appliance to rise for cooking purposes.

Such opening/closing safety means are well known to the person skilled in the art and make it possible to ensure that the lid is indeed in a stable locking position on the vessel, since the safety means cannot move under the effect of pressure unless the stable locking position has indeed been reached.

This makes it possible to avoid pressure rising in the event of a wrong locking position being reached. Conversely, fitting such opening/closing safety means prevents the appliance being opened inappropriately, i.e. when residual pressure remains inside the appliance, since the appliance can be opened only when the safety means 10 are in the low position. Preferably, the opening/closing safety means 10 are constituted by a pressure gauge rod system of the Aroma finger type.

Figure 3:
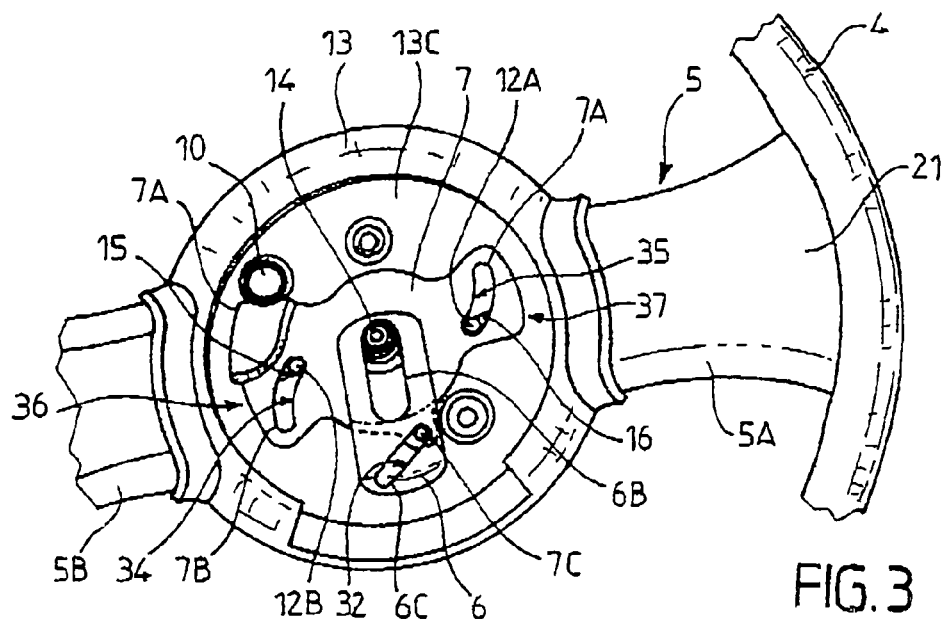
FIG. 3 is a diagrammatic fragmentary view in perspective showing an implementation detail of the device for controlling locking/unlocking of the lid of a pressure cooker in accordance with the invention.

Advantageously, and as shown in FIGS. 3 and 5, the intermediate part 7 is shaped so as to co-operate with the safety means 10 so that they prevent the intermediate part 7 from turning freely, and thus prevent the lid 2 from being unlocked while the safety means 10 are in the high position.

Advantageously, the intermediate part 7 is also shaped to prevent the safety means 10 from reaching the high position so long as the intermediate part 7 is in a position other than that corresponding to the lid 2 being locked.

Preferably, as shown in FIG. 3, the edge 7A of the intermediate part 7 that is in the vicinity of the safety finger 10 presents an inwardly-curved shape which is like a concave conformation, thereby allowing the safety finger 10 free to move axially. Once the finger 10 is in its high abutment position, the intermediate part 7 is no longer free to turn, since it is blocked by its own edge 7A coming into abutment laterally against the finger 10.

When the at least one jaw 4 is not in the closed position, the intermediate part 7 is not in the configuration shown in FIG. 3, but in a position in which the edge 7A overlies the safety finger 10 completely or in part, thereby preventing the safety finger from moving freely in an axial direction without coming into abutment against the edge 7A that overlies it. Thus, under such circumstances, the safety finger 10 cannot reach its high abutment position in which it closes off communication between the enclosure and the outside.

Thus, the pressure inside the appliance cannot rise, and cooking cannot take place normally so long as the intermediate part 7 is in a position other than that shown in the figures, which position corresponds to the at least one jaw 4 being locked.

In particularly preferred manner, and as shown in FIG. 9, the edge 7A is shaped so as to fit closely around half of the perimeter of the section of the safety finger 10, thereby optimizing the precision of the safety means 10.

The use of a rotary intermediate part 7 is thus particularly advantageous since it suffices to block this part in order to block the at least one jaw 4. The intermediate part 7 thus contributes to simplifying the design of the appliance, in particular for implementing the opening/closing safety means 10, and to making operation of the appliance more reliable.

Advantageously, the main control member 6 is an opening pusher suitable for being controlled manually.

Advantageously, the secondary control member 8 is likewise a closure pusher suitable for being controlled manually.

In a particularly advantageous embodiment of the invention, the lid 2 presents an inside face 2A facing towards the inside of the cooking enclosure and an opposite outside face 2B having mounted thereon a mechanism plate 13 provided with a vertical assembly pin 14 extending substantially axially, preferably from the center of the mechanism plate 13, towards the outside of the cooking receptacle.

Around the vertical assembly pin 14 the control-wheel-forming plate 7 is free to turn, with its oblong maneuvering slots 7A, 7B co-operating respectively with the corresponding rectilinear oblong slots 13A, 13B formed radially in the mechanism plate 13 to define two engagement openings 15, 16 on either side of the pivot point of the plate 7, said openings serving to engage said guide studs 12A, 12B, respectively.

Each oblong maneuvering slot 7A, 7B is thus superposed over the corresponding rectilinear oblong slot 13A, 13B so that when the plate 7 turns, each of the engagement openings 15, 16 moves in an opposite centrifugal or centripetal radial direction, between a centripetal position corresponding to locking (closure of the jaws 4, 4') and a centrifugal position corresponding to unlocking (opening of the jaws 4, 4'). Preferably, the engagement openings 15, 16 are substantially in alignment with the pivot point of the plate 7.

Such an arrangement thus provides mechanical interfacing between the mechanism plate 13 and the lid 2 that is particularly simple and compact.

The oblong maneuvering slots 7A, 7B preferably pass right through the thickness of the control-wheel-forming plate 7. Nevertheless, without going beyond the ambit of the invention, instead of implementing the guide slope function by the oblong maneuvering slots 7A, 7B, it is possible to envisage providing said function by means of grooves having the same shape and not passing through the plate, which could be advantageous for ensuring that the opening/closing mechanism is leaktight.

The mechanism plate 13 is also provided with the opening pusher 6 which is preferably guided in radial translation movement by an oblong hole 6B, with movement thereof being limited by the assembly pin 14. Nevertheless, the radial pusher 6 could be guided by any means known to the person skilled in the art without thereby going beyond the ambit of the invention.

The above-mentioned elements with which the mechanism plate 13 is provided are arranged in such a manner that radial displacement of the opening pusher 6 leads to rotary displacement of the control-wheel-forming plate 7, which rotary displacement causes radial displacement of the engagement openings 15, 16, which in turn entrain the guide studs 12A, 12B, and thus the arms 5A, 5B and the jaws 4, 4', into the unlocking position.

The presence of an intermediate 7 thus makes it possible to transform the radial translation movement of the main control member 6 into radial movement of the jaws 4, 4' in any other direction. The configurations shown in the figures are given purely by way of example. The angle-deflection function performed by the control-wheel-forming plate 7 can be implemented regardless of the direction in which the main control member 6 moves radially relative to the direction in which the jaws 4, 4' move.

It is thus possible, for example, to envisage that the direction in which the main control member 6 moves coincides with the direction in which the drive arms 5A, 5B and the jaws 4, 4' move.

The intermediate part 7 also makes it possible to reduce the force the user needs to exert on the main control member 6 in order to move the jaws 4, 4'. In the variants shown in FIGS. 3 and 9, this force reduction depends in particular on the ratio between:

firstly the distance between the oblong drive orifice 6C and the assembly pin 14; and secondly the distance between the oblong maneuvering slots 7A, 7B and the assembly pin 14.

Figure 6:
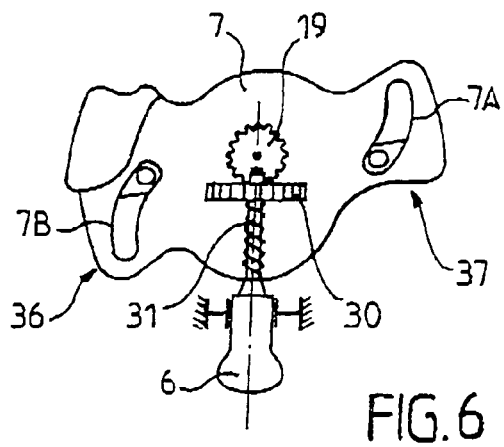
FIG. 6 shows a second variant embodiment of the clutch means of a device for controlling the movement of the jaws of a pressure cooker in accordance with the invention.
Figure 7:
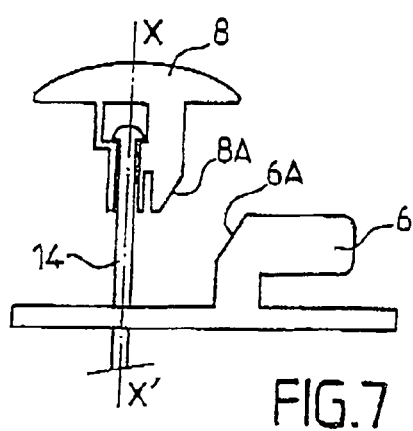
FIG. 7 is a diagram showing the principle of an embodiment detail of the device for controlling the movement of the jaws of a pressure cooker in accordance with the invention.
Figure 8:
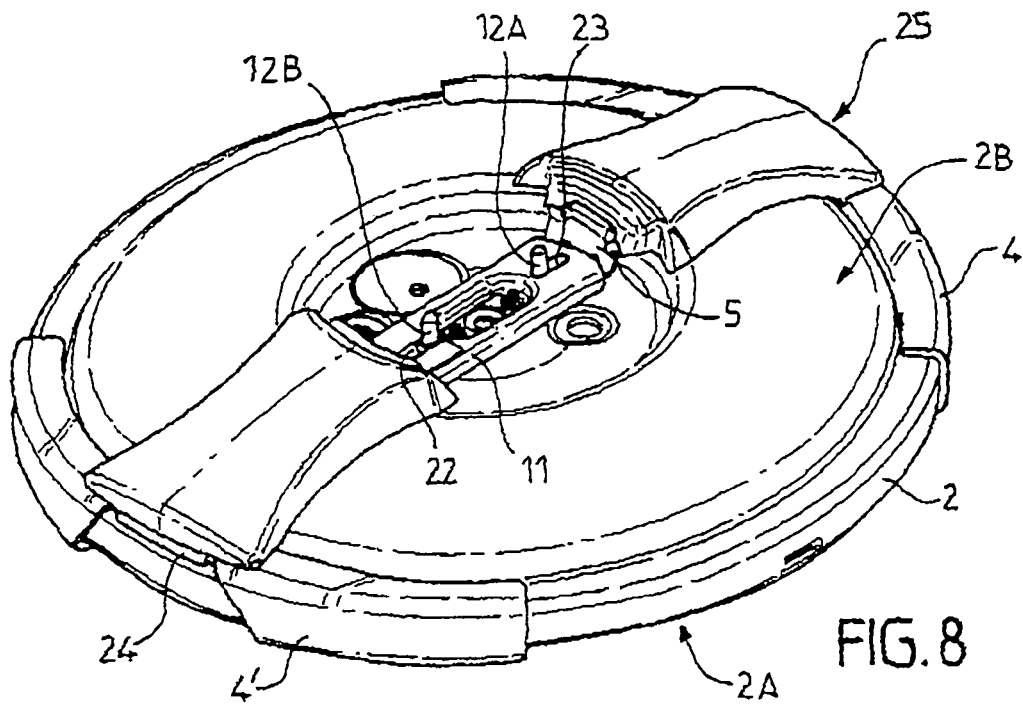
FIG. 8 is a perspective view showing the lid of a pressure cooker in accordance with the invention.

For the variants shown in FIGS. 4 and 6, force reduction also depends on the numbers of teeth belonging to the rack 18, the pinion 19, and the gearwheel 30, and also on the nature of the thread of the screw 31 (pitch, and thread angle in particular).

The amount of force reduction can thus easily be adjusted by the person skilled in the art acting on the above-mentioned parameters, and also on the dimension (length) of the maneuvering slots 7A, 7B and of the oblong drive orifice 6C.

Advantageously, the mechanism plate 13 is suitable for being fitted on and releasably secured to the lid 2.

Preferably, the mechanism plate 13 forms the seat 13C of a removable lid module 20.

Advantageously, the seat 13C is provided with:

a safety valve 25 against excess pressure;

a pressure regulator valve 26 provided with a rating system 27 that can be adjusted by the user;

a steam outlet duct 28 starting downstream from the pressure regulator valve 26 and having a temperature sensor mounted in the vicinity thereof; and a one-piece assembly including air vent means integrated in the pressure measuring rod 10.

The module 20 also comprises a top cover 40 which covers the seat 13C together with all of the elements that are mounted thereon, and comprising at least:

a housing 29 for receiving a timer 30, which housing 29 is provided with at least one electrical connection tab functionally connected to the temperature sensor; and the axial pusher 8.

The cooking appliance in accordance with the invention operates as follows.

Under the action of the return spring interconnecting the drive arms 5A, 5B, the vertical guide studs 12A, 12B at rest are situated in a stable position corresponding to closure of the jaws 4, 4', i.e. they are in their position that is closest to the center of the lid 2.

Under the effect of the compression spring connecting it to the seat 13C of the module 20, the control-wheel-forming plate 7 is positioned, at rest, in a position that corresponds to closure of the jaws 4, 4', and that is such that the openings 15, 16 are situated respectively in register with the axial guide studs 12A, 12B when the axis of symmetry X-X' coincides with the assembly pin 14.

Thus, while the module 20 is being docked on the lid 2, the axial guide studs 12A, 12B penetrate respectively into the engagement openings 15, 16, thereby providing a dynamic connection between the control pushers 6, 8 and the drive arms 5A, 5B together with the jaws 4, 4'.

Putting the lid 2 into place on the vessel 1 requires the jaws 4, 4 to be opened, which is done by actuating the radial opening pusher 6 in a centripetal radial direction. The progressive displacement of the pusher 6 enables the peg 7C to be slid along the drive slot 6C, which has the effect of turning the control-wheel-forming plate 7 in the clockwise direction. Turning of the plate 7 causes the guide studs 12A, 12B to slide in the maneuvering slots 7A, 7B formed in the plate 7, with the displacement of the guide studs 12A, 12B being limited laterally by the rectilinear slots 13A, 13B formed radially in the seat 13C of the module 20. The studs 12A, 12B are thus driven solely in radial translation towards the periphery of the pressure cooker, in a centrifugal direction. Since the studs 12A, 12B are connected to the drive arms 5A, 5B, these arms slide radially to the position in which the jaws 4, 4' are open. In the position reached in this way, the guide studs 12A, 12B co-operate (like cams with respective abutments) against the corresponding bends 38, 39 in the maneuvering slots 7A, 7B. The jaws 4, 4' are thus held in a stable unlocking position, thereby enabling the lid 2 to be centered on the edge of the vessel 1.

The cooking enclosure is closed, i.e. the jaws 4, 4 are moved into their locking position, by applying pressure with the palm of the hand on the axial abutment 8. Depressing this button causes the radial pusher 6 to move centrifugally in a radial direction because of interaction between the complementary inclined surfaces 6A and 8A associated respectively with the axial pusher 8 and with the radial pusher 6. Because of co-operation between the peg 7C and the drive slot 6C, the centrifugal displacement of the radial pusher 6 leads to turning of the control-wheel-forming plate 7 in the counterclockwise direction, such that the guide studs 12A, 12B are released from the reversible blocking means 9, 9', thereby enabling the plate 7, and thus the jaws 4, 4', to return resiliently to a stable locking position under drive from the compression spring 33 and from the return spring acting on the drive arms.

In the other embodiments shown in FIGS. 4 and 6, the force-reducing plate 7 is driven by the radial pusher 6 via a pinion 19. Under such circumstances, the radial displacement of the axial pusher causes the pinion 19 to turn, thereby driving the control-wheel-forming plate 7. It is entirely possible to provide a connection other than engagement between the pinion 19 and the control-wheel-forming plate 7, for example to interposed between the pinion 19 and the control-wheel-forming plate 7 a system of gearwheels seeking to further optimize the opening/closing dynamics.

The pressure cooker of the invention thus makes it possible to benefit from a device for controlling opening/closing that is particularly compact and ergonomic, since it can be actuated using one hand only, because:
- it relies on movement in translation;
- it provides a force-reducing effect; while simultaneously benefiting, in terms of compactness and simplicity of design, from the advantages that stem from an intermediate transmission that is rotary, e.g. in order to integrate a safety pressure measuring rod.

SUSCEPTIBILITY OF INDUSTRIAL APPLICATION

The industrial application of the invention lies in designing and manufacturing domestic appliances for cooking under pressure, and in particular pressure cookers.

The invention claimed is:

1. An appliance for cooking food under pressure, the appliance comprising:
   a vessel (1) and a lid (2) for being fitted to and locked on said vessel (1) in order to form a leaktight cooking enclosure;
   at least one jaw (4) and corresponding drive means 5, said jaw mounted to move in translation between a position in which the lid (2) is locked relative to the vessel (1), and an unlocking position; and
   a control device (6, 7, 8) for controlling the movement of the at least one jaw (4), the control device comprising:
      an intermediate part (7) comprising maneuvering means (7A, 7B) and clutch means (7C, 19), and mounted to turn freely relative to the drive means (5) so that the maneuvering means (7A, 7B) co-operates with said drive means (5) so as to control the displacement thereof; and
      a main control member (6) comprising transmission means (6C, 18, 30, 31), said main control member (6) being positioned relative to the intermediate part (7) so that the transmission means (6C, 18, 30, 31) co-operates with the clutch means (7C, 19) so as to control turning of the intermediate part (7) when the main control member (6) is actuated;
   wherein the main control member (6) is mounted to move in translation relative to the lid (2).

2. The cooking appliance according to claim 1, wherein the main control member (6) is mounted to move in a direction that is substantially radial.

3. The cooking appliance according to claim 1, wherein the at least one jaw (4) is mounted to move in a direction that is substantially radial.

4. The cooking appliance according to claim 1 wherein the main control member (6) controls rotation of the intermediate part (7).

5. The cooking appliance according to claim 1 wherein the clutch means (7C, 19) comprises a pinion (19) mounted to be axially stationary on the intermediate part (7).

6. The cooking appliance according to claim 5, wherein the transmission means (6C, 18, 30, 31) comprises a rack (18) arranged on the main control member (6) to mesh laterally with the pinion (19).

7. The cooking appliance according to claim 5, wherein the transmission means (6C, 18, 30, 31) comprises:
   a worm screw (31) mounted stationary on the main control member (6) and extending in the translation direction thereof; and
   a gearwheel (30) mounted stationary relative to the lid (2) and meshing perpendicularly with the pinion (19), said gearwheel (30) having a central tapped hole co-operating with the worm screw (31) so that movement in translation thereof causes the gearwheel (30) to move in rotation.

8. The cooking appliance according to claim 1, wherein the clutch means (7C, 19) comprises a guide peg (7C) extending axially from the intermediate part (7).

9. The cooking appliance according to claim 8, wherein the transmission means (6C, 18, 30, 31) comprises at least one plane surface (32) extending obliquely relative to the radial direction, and arranged in such a manner that movement in translation of the main control member (6) causes the guide peg (7C) to be engaged by said at least one plane surface (32), which pushes against the guide peg (7C), thereby causing the intermediate part (7) to turn.

10. The cooking appliance according to claim 8, wherein the transmission means (6C, 18, 30, 31) comprises an oblong drive orifice (6C) extending obliquely and co-operating with the guide peg (7C) in such a manner that a movement in translation of the control member (6) leads to a movement in rotation of the intermediate part (7).

11. The cooking appliance according to claim 1, wherein the intermediate part (7) is mounted to turn resiliently relative to the lid (2) in such a manner that its resilient return position corresponds to said at least one jaw (4) being locked.

12. The cooking appliance according to claim 11, wherein the intermediate part (7) is mounted to turn resiliently against a compression spring (33).

13. The cooking appliance according to claim 1, wherein the drive means (5) includes at least one drive arm (5A, 5B) guided to move in translation relative to the lid (2), and presenting an outer end (24, 25) connected to the at least one jaw (4) and an inner end (22, 23) for co-operating with the maneuvering means (7A, 7B).

14. The cooking appliance according to claim 13, wherein the inner end (22, 23) is provided with an axial guide stud (12A, 12B).

15. The cooking appliance according to claim 14, wherein the maneuvering means (7A, 7B) comprises at least one ramp-forming surface (34, 35) extending obliquely relative to the radial direction, and arranged in such a manner that when the intermediate part (7) turns, the ramp-forming surface (34, 35) engages the corresponding axial guide stud (12A, 128) and pushes said guide stud thereby causing the drive means (5A, 5B) to move.

16. The cooking appliance according to claim 14, wherein the maneuvering means (7A, 7B) comprises at least one oblong maneuvering slot (7A, 7B) arranged in the thickness of the intermediate part (7) to engage the corresponding axial guide stud (12A, 12B) in such a manner that turning the intermediate part (7) causes the drive means (5A, 5B) to move.

17. The cooking appliance according to claim 16, wherein the intermediate part (7) is a control-wheel-forming plate having at least one lug (36, 37) and a corresponding number of said at least one jaw (4) and in which the oblong maneuvering slots (7A, 7B) are formed in said at least one lug.

18. The cooking appliance according to claim 1, wherein the maneuvering means (7A, 7B) comprise a link having one of its ends connected to the drive means (5) and having a second end connected to the intermediate part (7).

19. The cooking appliance according to claim 1, wherein the drive means (5) is mounted to slide resiliently relative to the lid (2) in such a manner that its resilient return position corresponds to the at least one jaw (4, 4') being locked.

20. The cooking appliance according to claim 16, wherein the main control member (6) is dynamically coupled with a secondary control member (8) mounted to move on the lid in a substantially axial direction, said secondary control member (8) being suitable for causing the drive means (5A, 5B) to move in the locking direction.

21. The cooking appliance according to claim 20, wherein the control device (6, 7, 8) for controlling movement of the at least one jaw includes reversible blocking means (9, 9', 9") for locking the drive means (5A, 5B) in the unlocking position, the secondary control member (8) including release means (8A) for causing the reversible blocking means (9, 9', 9") to be released.

22. The cooking appliance according to claim 21, wherein the oblong maneuvering slots (7A, 7B) are shaped so that each comprises a bend (38, 39) which forms the reversible blocking means (9, 9').

23. The cooking appliance according to claim 1, further comprising closure/opening safety means (10) having a position that is sensitive to the pressure or the temperature that exists inside the cooking enclosure, said safety means (10) being mounted to move between two stable abutment positions, a low abutment position in which said safety means puts the inside of the enclosure into communication with the outside below a predetermined internal pressure $P_0$, and a high position in which it closes off communication between the enclosure and the outside when the pressure $P_0$ is reached, so as to allow the pressure inside the appliance to rise for cooking purposes.

24. The cooking appliance according to claim 23, wherein the closure/opening safety means (10) is a pressure-measuring rod.

25. The cooking appliance according to claim 23, wherein the intermediate part (7) is shaped in such a manner as to co-operate with the safety means so that the safety means prevents the intermediate part (7) from turning freely, and thus prevents the lid (2) from unlocking so long as the safety means is in the high position, said intermediate part (7) also being shaped so as to prevent the safety means (10) from reaching the high position so long as the intermediate part (7) is in a position other than that corresponding to the lid (2) being locked.

26. The cooking appliance according to claim 1, wherein the main control member (6) is an opening pusher suitable for being controlled by hand.

27. The cooking appliance according to claim 1, wherein a secondary control member (8) formed as a closure pusher suitable for being controlled by hand.

28. The cooking appliance according to claim 1, wherein the lid (2) comprises an inside face (2A) facing towards the inside of the cooking enclosure and an opposite, outside face (2B) having mounted thereon a mechanism plate (13), the mechanism plate comprising:

- a vertical assembly pin (14) about which the intermediate part (7) is mounted to turn freely, the oblong maneuvering slots (7A, 7B) thereof co-operating with respective corresponding rectilinear oblong slots (13A, 13B) formed radially in the mechanism plate (13) to define two engagement openings (15, 16) for each of said guide studs (12A, 12B), respectively; and
- an opening pusher (6);
- wherein the mechanism plate is arranged in such a manner that radial displacement of the opening pusher (6) leads to turning of the intermediate part (7), where such turning causes said at least one jaw (4) to move to the unlocking position.

29. The cooking appliance according to claim 28, wherein the mechanism plate (13) is suitable for being fitted and releasably secured to the lid (2).

* * * * *